(12) United States Patent
Chen

(10) Patent No.: US 7,504,448 B2
(45) Date of Patent: Mar. 17, 2009

(54) ARTICLES PREPARED FROM COMPOSITIONS MODIFIED WITH ORGANIC FIBER MICROPULP

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 259 days.

(21) Appl. No.: 11/280,729

(22) Filed: Nov. 16, 2005

(65) Prior Publication Data

US 2006/0079651 A1    Apr. 13, 2006

Related U.S. Application Data

(62) Division of application No. 10/846,790, filed on May 14, 2004, now Pat. No. 7,144,958.

(60) Provisional application No. 60/472,635, filed on May 22, 2003, provisional application No. 60/472,185, filed on May 21, 2003.

(51) Int. Cl.
*C08L 33/02* (2006.01)
*C08L 77/10* (2006.01)
*C08L 67/00* (2006.01)
*C08L 77/00* (2006.01)

(52) U.S. Cl. .................. 524/322; 524/394; 525/183; 525/424; 525/425; 525/432; 36/43; 36/69; 36/77 M

(58) Field of Classification Search ............ None
See application file for complete search history.

(56) References Cited

U.S. PATENT DOCUMENTS

| 6,598,323 B1 * | 7/2003 | Gougelet et al. ............ 36/77 R |
| 2003/0114641 A1 * | 6/2003 | Kelly et al. ................. 528/501 |

FOREIGN PATENT DOCUMENTS

| JP | 10120842 | * | 5/1998 |
| WO | WO 02/48460 | * | 6/2002 |

OTHER PUBLICATIONS

Kroschwitz, Concise Encyclopedia of Polymer Science and Engineering, 1990 p. 753.*

* cited by examiner

*Primary Examiner*—David Buttner

(57) ABSTRACT

Disclosed are molded articles such as covers, mantles and cores for golf balls, one-piece thermoplastic golf balls, and heel counters and toe puffs for footwear, prepared from compositions comprising thermoplastic elastomers, thermoplastic carboxylic acid-based ionomers, thermoplastic polyurethanes and thermoset polyurethanes modified with micropulp produced from organic fibers. The compositions are tougher, stronger, and more scuff and abrasion resistant than typical ionomer compositions. Also disclosed are methods for making golf balls comprising said compositions.

7 Claims, No Drawings

ARTICLES PREPARED FROM COMPOSITIONS MODIFIED WITH ORGANIC FIBER MICROPULP

CROSS-REFERENCES TO RELATED APPLICATIONS

This application is a divisional of U.S. application Ser. No. 10/846,790, filed on May 14, 2004, and now issued as U.S. Pat. No. 7,144,958, which, in turn, claims priority under 35 U.S.C. § 120 to U.S. Provisional Application No. 60/472,185, filed on May 21, 2003, and U.S. Provisional Application No. 60/472,635, filed on May 22, 2003, each of which is incorporated herein by reference in its entiety. herein for all purposes as if fully set forth.

FIELD OF THE INVENTION

The present invention relates to articles prepared from compositions modified with organic fiber micropulp. In particular, the compositions comprise at least one polymer selected from thermoplastic elastomers, thermoplastic carboxylic acid-based ionomers, polyurethane-ureas, thermoplastic polyurethanes or thermoset polyurethanes modified with micropulp produced from organic fibers. The compositions are tougher, stronger, and more scuff and abrasion resistant than typical compositions. The compositions are suitable for molding applications useful for preparing molded articles. When the micropulp is dispersed in an organic dispersant before being incorporated into the thermoplastic or thermoset polymers, either through blending or during condensation polymerization, additional property modifications can result by the incorporation of the dispersing agents. For example, ionomer compositions incorporating a dispersion of micropulp in a fatty acid and simultaneously or subsequently neutralized are useful for preparing covers, mantles and cores for golf balls, and one-piece thermoplastic golf balls. The compositions are also useful for preparing heel counters, toe puffs and inner soles for footwear.

BACKGROUND OF THE INVENTION

All references disclosed herein are incorporated by reference.

Ionomeric resins (ionomers) are copolymers of an olefin such as ethylene and an unsaturated carboxylic acid, such as acrylic acid, methacrylic acid, or maleic acid, and optionally softening monomers, that have at least some portion of the acidic groups in the copolymer neutralized with metal ions such as sodium, lithium, calcium, magnesium or zinc. Ionomers are thermoplastic resins exhibiting enhanced properties, e.g. improved resilience, stiffness, toughness, durability, etc., for golf ball cover construction over balata (see below). As a result of their resilience, toughness, durability and flight characteristics, various ionomeric resins sold by E. I. du Pont de Nemours and Company under the trademark "Surlyn®" and by the Exxon Corporation under the trademark "Escor®" and the tradename "Iotek" have become materials of choice for the construction of golf ball covers over the traditional balata (natural or synthetic rubber) covers. The softer balata covers, although exhibiting enhanced playability properties, lack the durability and cut resistance necessary for repetitive play.

Thermoplastic elastomers include, for example, copolyetheresters copolyetheresteramides. Compositions including polyetherester elastomers comprising polytrimethylene ether ester soft segment and tetramethylene or trimethylene ester hard segments are described, for example, in U.S. Pat. Nos. 6,562,457; 6,599,625; 5,128,185; 4,937,314; and 4,906,729. In addition, polytrimethylene ether ester amides are described in U.S. Pat. No. 6,590,065.

1,3-Propanediol ("PDO") is a versatile building block for making polymers. For example, poly(trimethylene terephthalate), or "PTT" is well known and commercially available as polymer or fiber, suitable for many end uses. Other polymers derived from PDO include polyethers and polyether based copolymers. Among these are polytrimethylene ether glycol ("PO3G") and its block copolymer derivatives. PO3G is the low molecular weight polyether polyol produced from polycondensation of PDO and has been described in a number of patents and patent applications. PO3G has numerous uses, especially in thermoplastic elastomers, as well as in other applications. Heretofore PO3G derivatives have been primarily directed toward fiber applications due to superior tenacity and elongation properties, among others.

The golf ball industry has also developed golf ball covers formed from polyurethane compositions. These covers combine good scuff resistance and a softness that enables spin control and good playability. Because of this combination of desirable factors, a number of premium golf balls with polyurethane covers (e.g. Titleist's Pro V-1) are providing better play control for the more skilled player.

Polyurethanes and polyurethane-ureas derived from PO3G are described in U.S. Patent Application Publication No. 2004/0030060.

In addition to their improved durability, harder covers tend to minimize ball spin and enable the ball to travel more straight off the clubface. Although some golfers prefer golf balls that maximize distance and provide low spin characteristics, others prefer softer, more resilient golf balls that enable spin control. Because of the different preferences of golfers, it is desirable to continue developing golf balls that have the desired properties with increased durability and toughness. Thus, it would be useful to develop a material for golf ball covers, mantles, intermediate layers, etc. having a combination of degrees of hardness and resilience and good scuff resistance with improved heat stability and melt processibility.

Current commercial ionomers derived from dipolymers have properties that vary according to the type and amount of metal cations, molecular weight and composition of the base resin (i.e. relative content of ethylene and methacrylic and/or acrylic acid groups). Ionomers can also be modified by the addition of comonomers to modify their physical properties. For example, terpolymers made from an olefin such as ethylene, an unsaturated carboxylic acid and other comonomers such as alkyl (meth)acrylates provide softer resins which can be neutralized to form softer ionomers. Attempts to provide harder ionomers include using relatively high percentages of the carboxylic acid moieties in the copolymer. The ethylene acid copolymers with high levels of acid can be difficult to prepare in continuous polymerizers because of monomer-polymer phase separation. This difficulty can be avoided by use of "co-solvent technology" as described in U.S. Pat. No. 5,028,674 or by employing somewhat higher pressures than those at which copolymers with lower acid are typically prepared. Despite these expedients, there is an inherent limit to the amount of the carboxylic acid-containing moieties that can be incorporated as comonomers in ethylene acid copolymers.

Another way to modify the properties of a thermoplastic composition is by blending a thermoplastic resin such as an ethylene acid copolymer or ionomer with other components. This allows one to more easily modify the properties of a composition by manipulating the amount and type of modifiers present in the composition in addition to varying the percentages of the monomers in the copolymer. Furthermore, blending modifiers can allow for easier, lower cost manufacture of polymer compositions by allowing one to prepare fewer base resins that can be subsequently modified to obtain desired properties.

Alternatively, compositions can be modified by blending modifiers with one or more of the comonomers of the thermoset resin prior to mixing with the other comonomers. This allows one to modify the properties of a composition by manipulating the amount and type of modifiers present in the composition in addition to varying the percentages of the various comonomers that make up the copolymer. These methods are particularly useful for modifying copolyetheresters, copolyetheresteramides, polyurethanes and polyurethaneureas.

The present invention provides for thermoplastic or thermoset compositions that are tougher, stronger, and more scuff and abrasion resistant than typical thermoplastic compositions by the incorporation of organic fiber micropulp as a modifier and their use in articles such as golf balls.

U.S. patent application Ser. No. 10/295,455 filed Nov. 15, 2002, relates to a process for producing organic fiber micropulp in a liquid component and discloses that liquid component can be an aqueous liquid, one or more liquid polymers, one or more solvents, or a combination thereof.

SUMMARY OF THE INVENTION

An object of this invention is to provide a golf ball with a cover having good scuff resistance.

Another object of this invention is to provide a golf ball having a favorable combination of spin and durability.

A further object of the invention is to provide a golf ball having a tough cover, mantle, intermediate layer, core and/or center made from a material that is easy to process.

Accordingly, this invention provides a golf ball with at least one component selected from the group consisting of cover, mantle, intermediate layer, core and center comprising a composition consisting essentially of:

(a) at least one polymer selected from the group consisting of thermoplastic elastomers, thermoplastic carboxylic acid-based ionomers, polyurethane-ureas, thermoplastic polyurethanes and thermoset polyurethanes; and (b) micropulp produced from organic fibers.

This invention provides a golf ball with at least one component selected from the group consisting of cover, mantle, intermediate layer, core and center comprising a composition comprising:

(a) at least one polymer selected from the group consisting of thermoplastic elastomers, thermoplastic carboxylic acid-based ionomers, polyurethane-ureas, thermoplastic polyurethanes and thermoset polyurethanes; and (b) micropulp produced from organic fibers.

This invention also provides a golf ball with a cover, mantle, intermediate layer, core and/or center made of said composition further comprising at least one additional component selected from nonionomeric thermoplastic polymers.

This invention also relates to methods for making golf balls with covers, mantles, intermediate layers, cores and/or centers as described above, comprising obtaining a golf ball core and forming a cover, mantle, intermediate layer, core and/or center formed of the compositions as described above over the core. This invention also relates to methods for making golf balls as described above, comprising molding a composition as described above into the shape of golf ball mantles, intermediate layers, cores and/or centers and forming covers over them.

This invention also relates to one-piece golf balls comprising a composition comprising:

(a) at least one polymer selected from the group consisting of thermoplastic elastomers, thermoplastic carboxylic acid-based ionomers, polyurethane-ureas, thermoplastic polyurethanes and thermoset polyurethanes; and (b) micropulp produced from organic fibers.

This invention also relates to methods for making one-piece golf balls as described above, comprising molding a composition as described above into the shape of a golf ball.

The micropulp-modified compositions described above, or blends thereof with nonionomeric thermoplastic polymers, can be processed in molding applications for golf ball applications such as the cover and/or intermediate layers, core and center of 2-, 3- or multiple-piece (multilayer) golf balls, and as 1-piece balls.

This invention also provides a footwear structural component selected from the group consisting of heel counters, toe puffs, and inner soles comprising a composition comprising:

(a) at least one polymer selected from the group consisting of thermoplastic elastomers, thermoplastic carboxylic acid-based ionomers, polyurethane-ureas, thermoplastic polyurethanes and thermoset polyurethanes; and (b) micropulp produced from organic fibers.

DETAILED DESCRIPTION OF THE INVENTION

"Copolymer" means polymers containing two or more different monomers. The terms "dipolymer" and "terpolymer" mean polymers containing only two and three different monomers respectively. The phrase "copolymer of various monomers" and the like means a copolymer whose units are derived from the various monomers.

Organic Fibers

The compositions and golf balls thereof of the present invention utilize organic fibers that are known in the art. The organic fibers can be in the form of continuous filament; short fibers either produced directly or cut from the continuous filament; pulp or fibrids.

Floc comprises generally short fibers made by cutting continuous filament fibers into short lengths without significant fibrillation; and the lengths of short fibers can be of almost any length, but typically they vary from about 1 mm to 12 mm for a reinforcing fiber and up to several centimeters for a staple fiber that is spun into a yarn. Short fibers suitable for use in the present invention are the reinforcing fibers disclosed in U.S. Pat. No. 5,474,842. An example of a typical commercially available floc is 1.5 mm Kevlar® 6F561 Floc supplied by DuPont of Wilmington, Del.

Pulp can be made by refining fibers to fibrillate the short pieces of the fiber material. Pulp can be also made by casting a polymerizing solution of polymer material and grinding and refining the solution, once solidified. Such a process is disclosed in U.S. Pat. No. 5,028,372. Pulp particles differ from short fibers by having a multitude of fibrils or tentacles extending from the body of each pulp particle. These fibrils or tentacles provide minute, hair-like anchors for reinforcing composite materials and cause the pulp to have a very high surface area. An example of a typical commercially available pulp is Kevlar® 1F361, supplied by E. I. du Pont de Nemours and Company of Wilmington, Del.

Fibrids are substantially sheet-like structures, which can be made in accordance with the process disclosed in U.S. Pat.

Nos. 5,209,877, 5,026,456, 3,018,091 and 2,999,788. The process includes adding a solution of organic polymer, with vigorous agitation, to a liquid, which is a non-solvent for the polymer and is miscible with the solvent of the solution, to cause coagulation of fibrids; the coagulated fibrids are wet milled and separated from the liquid; the separated fibrids are dried, by means appropriate, to yield clumps of fibrids having a high surface area; and the clumps are opened to yield a particulate fibrid product. The Product Information brochure identified as H-67192 10/98 published DuPont Canada Inc. in Mississauga, Ontario, Canada illustrates the film-like physical structure of typical fibrids known as F20W DuPont fibrids.

The organic fibers suitable for use in the present invention can be made of aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or a mixture thereof. More preferred polymers are made from aromatic polyamides, polybenzoxadiazole, polybenzimidazole, or a mixture thereof. Most preferred organic fibers comprise fibers made from the aromatic polyamide polymers poly(p-phenylene terephthalamide) and/or poly(m-phenylene isophthalamide). Such fibers are also known as aramid fibers. For example, poly(p-paraphenylene terephthalamide) is a condensation polymer derived from paraphenylene diamine and terephthalic acid. The polymeric chains in the fibers are highly oriented with strong interchain bonding providing high tensile strength, toughness and cut resistance. As used herein, "aramid" is meant a polyamide wherein at least 85% of the amide (—CONH—) linkages are attached directly to two aromatic rings. Additives can be used with the aramid. Up to as much as 10 percent by weight of other polymeric material can be blended with the aramid or copolymers can be used having as much as 10 percent of other diamine substituted for the diamine of the aramid or as much as 10 percent of other diacid chlorides substituted for the diacid chloride of the aramid. The aromatic polyamide organic fibers disclosed in U.S. Pat. Nos. 3,869,430; 3,869,429; 3,767,756; and 2,999,788, are preferred. Such aromatic polyamide organic fibers and various forms of these fibers are available from E. I. du Pont de Nemours and Company, Wilmington, Del., under the trademark Kevlar® fibers, such as Kevlar® Aramid Pulp 1F543, 1.5 mm Kevlar® Aramid Floc 6F561, DuPont Nomex® aramid Fibrids F25W.

Other suitable commercial polymer fibers include:

Zylon® PBO-AS (Poly(p-phenylene-2,6-benzobisoxazole) fiber, Zylon® PBO-HM (Poly(p-phenylene-2,6-benzobisoxazole)) fiber, Dyneema® SK60 and SK71 ultra high strength polyethylene fiber, all supplied by Toyobo, Japan; Celanese Vectran® HS pulp, EFT 1063-178, supplied by Engineering Fibers Technology, Shelton, Conn.; CFF Fibrillated Acrylic Fiber supplied by Sterling Fibers Inc, Pace, Fla.; and Tiara Aramid KY-400S Pulp supplied by Daicel Chemical Industries, Ltd, 1 Teppo-Cho, Sakai City Japan.

The organic fibers suitable for use in the present invention also include natural fibers, such as cellulose, cotton and wool fibers.

The organic fibers described above can be converted into micropulp having a volume average length ranging from 0.01 micrometers to 100 micrometers, preferably ranging from 1 micrometers to 50 micrometers and alternatively ranging from 0.1 micrometers to 10 micrometers. As used herein, the volume average length means:

$$\frac{\sum (\text{number of fibers of given length}) \times (\text{length of each fiber})^4}{\sum (\text{number of fibers of given length}) \times (\text{length of each fiber})^3}$$

Generally, the micropulp comprising fibrous organic material has an average surface area ranging from 25 to 500 square meter per gram, preferably ranging from 25 to 200 square meter per gram and more preferably ranging from 30 to 80 square meter per gram.

The micropulp of the aforesaid fibers is prepared by contacting organic fibers with a medium comprising a liquid component and a solid component and agitating the mixture in devices such as attritors, media mills or ball mills. The agitation is a size-reduction and fiber modification process in which the organic fibers repeatedly come in contact with the solid components, such as steel balls, maintained in an agitated state by, for example, one or more stirring arms of an attritor to masticate the fibers. Unlike the conventional grinding or chopping processes that tend to reduce the fiber length, albeit with some increase in surface area and fibrillation, the size reduction in the attriting process results from both longitudinal separation of the organic fibers into substantially smaller diameter fibers and a length reduction. Fiber length reductions of one, two or even greater orders of magnitude can be attained. Pending U.S. patent application Ser. No. 10/295,455, provides further information on the production of organic fiber micropulp.

Resins

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

Thermoset compositions are polymeric materials that are prepared by mixed the comonomers and then heating the mixture in a mold to form a copolymer formed to the desired shape.

Thermoplastic elastomers include, for example, copolyetheresters copolyetheresteramides.

Copolyetheresters are discussed in detail in patents such as U.S. Pat. Nos. 3,651,014; 3,766,146; and 3,763,109. Preferred copolyetherester polymers are those in which the polyether segment is obtained by polymerization of tetrahydrofuran and the polyester segment is obtained by polymerization of tetramethylene glycol (1,4-butanediol) and phthalic acid. Of course, the more polyether units incorporated into the copolyetherester, the softer the polymer.

Copolyetheresters modified by organic micropulp can be prepared by first preparing a dispersion of micropulps in a diol (for example, 1,4-butanediol). Such dispersions can be readily prepared by using the diol as the liquid component in the attrition process described above for the preparation of the organic micropulp. The dispersion is combined with poly (tetramethyleneether) glycol and dimethyl phthalate in a heated stirred reactor. The condensation polymer is formed by removal of methanol by distillation and further heating. U.S. patent application Ser. No. 10/428,294 provides more detailed descriptions of preparing dispersions of micropulp in condensation comonomers and their subsequent polymerization.

Other preferred thermoplastic elastomers are those in which the polyether segment is obtained by polymerization of 1,3-propanediol.

The polytrimethylene ether glycols that can be used in the manufacture of PO3G compositions useful in this invention are prepared by the acid-catalyzed polycondensation of 1,3-propanediol, preferably as described in U.S. Published Patent Application Nos. 2002/7043 A1 and 2002/10374 A1. These polytrimethylene ether glycols have a number of features that distinguish them from polytrimethylene ether glycols prepared from oxetane. Most notably, they contain unsaturated end groups, predominately allyl end groups, in the range of about 0.003 to about 0.015 meq/g, preferably at least about 0.005 meq/g, and preferably up to about 0.014 meq/g, more preferably up to about 0.012 meq/g. In one preferred embodiment, they contain greater than 0.005 meq/g, even more preferably at least 0.006 meq/g, of unsaturated end groups.

The polytrimethylene ether glycols have a number average molecular weight (Mn) in the range of about 1,000 to about 4,000, preferably up to 3,000.

The polydispersity of the polytrimethylene ether glycol is preferably within the range of 1.5 to 2.1. Using blends of polytrimethylene ether glycols the polydispersity can be adjusted.

The terms "polytrimethylene ether glycol composition" or "PO3G compositions" are used herein to indicate that a composition comprises trimethylene ether repeat units. Such compositions are polytrimethylene ether glycol derivatives, which include polyetherester elastomers comprising a polytrimethylene ether soft segment; polyether-ester-amide elastomers comprising a polytrimethylene ether soft segment; and polyurethanes and polyurethane-ureas prepared by reaction of (a) polytrimethylene ether glycol, (b) diisocyanate, and (c) diol or diamine chain extender. The PO3G composition may be present either alone or in blends with other polymers.

Described hereinbelow are particular polytrimethylene ether glycol (PO3G) compositions useful in articles of this invention. These compositions are also referred to herein as polytrimethylene ether glycol derivatives. It should be recognized that these compositions may be present alone, in blends with other PO3G compositions or in blends with other polymers.

Polytrimethylene ether ester elastomers

Polytrimethylene ether ester elastomers useful in articles of this invention comprise trimethylene ether repeat units. Particularly useful polytrimethylene ether ester elastomers comprise about 60 to about 90 weight % polytrimethylene ether ester soft segment and about 10 to about 40 weight % trimethylene ester or tetramethylene ester hard segment.

Herein, "polytrimethylene ether ester soft segment" and "soft segment" are used to refer to the reaction product of polymeric ether glycol and dicarboxylic acid equivalent which forms an ester connection, wherein at least 40 weight % of the polymeric ether glycol used to form the soft segment is polytrimethylene ether glycol (PO3G).

When PO3G is used to form the soft segment, it can be represented as comprising units represented by the following structure:

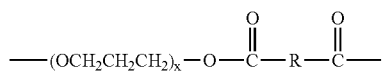

where x is preferably about 17 to about 86 and R represents a divalent radical remaining after removal of carboxyl functionalities from a dicarboxylic acid equivalent.

By "hard segment" reference is to the reaction product of diol(s) and dicarboxylic acid equivalent which forms an ester connection, wherein at least 50 mole %, of the diol used to form the hard segment is 1,3-propanediol or 1,4-butanediol.

The hard segment can be represented as comprising units having the following structure:

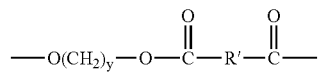

where $O(CH_2)_yO$ represents the diol such that in at least 50 mole % of the hard segment y is 3 or 4, and where R' represents a divalent radical remaining after removal of carboxyl functionalities from a dicarboxylic acid equivalent. In most cases, the dicarboxylic acid equivalents used to prepare the soft segment and the hard segment of the polyether ester of this invention will be the same.

The hard segment can also be prepared with up to 50 mole % (preferably up to 25 mole %, more preferably up to 15 mole %), of mixtures of diols. The diol mixture can be a combination of 1,3-propanediol with 1,4-butanediol or one of these with other diols. Preferably, the diols have a molecular weight lower than 400 g/mol. The other diols are preferably aliphatic diols and can be acyclic or cyclic. Preferred are diols with from 2 to 15 carbon atoms such as 1,3-propanediol and 1,4-butanediol, and ethylene, isobutylene, pentamethylene, 2-methyltrimethylene, 2,2-dimethyltrimethylene, hexamethylene and decamethylene glycols, dihydroxy cyclohexane, cyclohexane dimethanol, hydroquinone bis(2-hydroxyethyl) ether. Especially preferred are aliphatic diols containing from 2 to 8 carbon atoms. Most preferred are diol mixtures selected from the group consisting of ethylene glycol, 1,3-propanediol and 1,4-butanediol.

By "dicarboxylic acid equivalent" is meant dicarboxylic acids and their equivalents from the standpoint of making the compositions of this invention, as well as mixtures thereof. The equivalents are compounds that perform substantially like dicarboxylic acids in reaction with glycols and diols.

The dicarboxylic acid equivalents can be aromatic, aliphatic or cycloaliphatic. In this regard, "aromatic dicarboxylic acid equivalents" are dicarboxylic acid equivalents in which each carboxyl group is attached to a carbon atom in a benzene ring system such as those mentioned below. "Aliphatic dicarboxylic acid equivalents" are dicarboxylic acid equivalents in which each carboxyl group is attached to a fully saturated carbon atom or to a carbon atom that is part of an olefinic double bond. If the carbon atom is in a ring, the equivalent is "cycloaliphatic."

The dicarboxylic acid equivalent can contain any substituent groups or combinations thereof, so long as the substituent groups do not interfere with the polymerization reaction or adversely affect the properties of the polyether ester product. Dicarboxylic acid equivalents include dicarboxylic acids, diesters of dicarboxylic acids, and diester-forming derivatives such as acid halides (e.g., acid chlorides) and anhydrides.

Especially preferred are the dicarboxylic acid equivalents selected from the group consisting of dicarboxylic acids and diesters of dicarboxylic acids. More preferred are dimethyl esters of dicarboxylic acids.

Preferred are the aromatic dicarboxylic acids or diesters by themselves, or with small amounts of aliphatic or cycloaliphatic dicarboxylic acids or diesters. Still more preferred are the dimethyl esters of aromatic dicarboxylic acids.

Representative aromatic dicarboxylic acids are terephthalic, bibenzoic, isophthalic and naphthalic acid; dimethyl terephthalate, bibenzoate, isophthalate, naphthalate and phthalate; and mixtures thereof. Representative aliphatic and cycloaliphatic dicarboxylic acids are sebacic acid, 1,3- or 1,4-cyclohexane dicarboxylic acid, adipic acid, dodecanedioic acid, glutaric acid, succinic acid, oxalic acid, azelaic acid, suberic acid, cyclopentanenedicarboxylic acid, decahydro-1,5- (or 2,6-)naphthalene dicarboxylic acid, and 1,1-cyclobutane dicarboxylate.

The dicarboxylic acid equivalents in the form of diesters, acid halides and anhydrides of the aforementioned aromatic and aliphatic dicarboxylic acids are also useful to provide the polyether ester of the present invention. Representative aromatic diesters include dimethyl terephthalate, dimethyl bibenzoate, dimethyl isophthalate, dimethyl phthalate and dimethyl naphthalate. Particularly preferred dicarboxylic acid equivalents are the equivalents of phenylene dicarboxylic acids especially those selected from the group consisting of terephthalic and isophthalic acid and their diesters, especially the dimethyl esters, dimethyl terephthalate and dimethyl isophthalate. In addition, two or more dicarboxylic acids equivalents can be used. For instance, terephthalic acid or dimethyl terephthalate can be used with small amounts of the other dicarboxylic acid equivalents. In one example, a mixture of diesters of terephthalic acid and isophthalic acid was used.

Polytrimethylene ether ester amides

Polytrimethylene ether-ester-amides useful in one or more of the layers of the golf ball of this invention comprise a polytrimethylene ether soft segment and are referred to herein as polytrimethylene ether ester amides. These comprise polyamide hard segments or blocks joined by ester linkages to polyether soft segments or blocks. Thus, they are sometimes referred to as block copolymers. They are prepared by reacting carboxyl terminated polyamide (or acid equivalents thereof) and polytrimethylene ether glycol.

Herein, when referring to the polytrimethylene ether ester amide, carboxyl terminated polyamide or acid equivalents thereof, polytrimethylene ether glycol, etc., it should be understood that reference is to one or more of these items. Thus, for instance, when referring to at least 40 weight % of the polymeric ether glycol used to form the soft segment being polytrimethylene ether glycol, it should be understood that one or more polytrimethylene ether glycols can be used.

The general structure of polytrimethylene ether ester amides can be thought of with reference to formula (I)

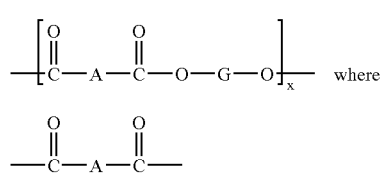

where

represents a polyamide segment containing terminal carboxyl groups or acid equivalents thereof, and

-O-G-O- (III)

is a polyether segment, and x is 1 up to an average of about 60, and wherein at least 40 weight % of the polyether segments comprise polytrimethylene ether units. (A and G are used to depict portions of the segments which are ascertained from the description of the polytrimethylene ether ester amide and starting materials.)

The polyamide segment preferably has an average molar mass of at least about 300, more preferably at least about 400. Its average molar mass is preferably up to about 5,000, more preferably up to about 4,000 and most preferably up to about 3,000.

The polytrimethylene ether segment preferably has an average molar mass of at least about 800, more preferably at least about 1,000 and more preferably at least about 1,500. Its average molar mass is preferably up to about 5,000, more preferably up to about 4,000 and most preferably up to about 3,500.

The polytrimethylene ether ester amide contains at least one polyether ester amide repeat unit. It preferably comprises up to an average of up to about 60 polyalkylene ether ester amide repeat units. Preferably it averages at least about 5, more preferably at least about 6, polyalkylene ether ester amide repeat units. Preferably it averages up to about 30, more preferably up to about 25, polyalkylene ether ester amide repeat units.

The weight percent of polyamide segment, also sometimes referred to as hard segment, is preferably at least about 10 weight % and most preferably at least about 15 weight % and is preferably up to about 60 weight %, more preferably up to about 40 weight %, and most preferably up to about 30 weight %. The weight percent of polytrimethylene ether segment, also sometimes referred to as soft segment, is preferably up to about 90 weight %, more preferably up to about 85 weight %, and is preferably at least about 40 weight %, more preferably at least about 60 weight %, and most preferably at least about 70 weight %.

Carboxyl terminated polyamides or acid equivalents thereof, such as diacid anhydrides, diacid chlorides or diesters, useful in preparing the polytrimethylene ether ester amides of this invention are well known. They are described in many patents and publications related to the manufacture of other polyalkylene ester amides, such as U.S. Pat. Nos. 4,230,838, 4,252,920, 4,331,786, 4,349,661 and 6,300,463.

Preferred polyamides are those having dicarboxylic chain ends and most preferred are linear aliphatic polyamides which are obtained by methods commonly used for preparing such polyamides, such as processes comprising the polycondensation of a lactam, an amino-acid or a diamine with a diacid, such as described in U.S. Pat. No. 4,331,786.

Preferred polyether ester amides are those in which the carboxyl-terminated polyamide was derived from the polycondensation of lactams or amino-acids with a dicarboxylic acid. The dicarboxylic acid functions as a chain limiter and the exact ratio of lactam or amino-acid to dicarboxylic acid is chosen to achieve the final desired molar mass of the polyamide hard segment. Preferred lactams contain from 4 to 14 carbon atoms, such as lauryl lactam, caprolactam and undecanolactam. Most preferred is lauryl lactam. Preferred amino acids contain from 4 to 14 carbon atoms and include 11-amino-undecanoic acid and 12-aminododecanoic acid. The dicarboxylic acid can be either linear aliphatic, cycloaliphatic, or aromatic. The preferred dicarboxylic acids contain from 4 to 14 carbon atoms. Examples include succinic acid, adipic acid, suberic acid, azelaic acid, sebacic acid, undecanedioic acid, dodecanedioic acid, terephthalic acid, and isophthalic acid. Most preferred are the linear aliphatic dicarboxylic acids, especially adipic acid and dodecanedioic acid.

The polyamide can also be a product of the condensation of a dicarboxylic acid and diamine. In this case an excess of the diacid is used to assure the presence of carboxyl ends. The exact ratio of diacid to diamine is chosen to achieve the final desired molar mass of the polyamide hard segment. Linear aliphatic or cycloaliphatic diacids can be used. The preferred dicarboxylic acids contain from 4 to 14 carbon atoms and most preferred are linear aliphatic dicarboxylic acids that contain from 4 to 14 carbon atoms. Examples include succinic acid, adipic acid, suberic acid, azelaic acid, sebacic acid, undecanedioic acid and dodecanedioic acid. Most preferred is dodecanedioic acid. Linear aliphatic diamines containing from 4 to 14 carbon atoms are preferred. Hexamethylenediamine is most preferred. Examples of polyamides derived from the aforementioned diacids and diamines include nylon 6-6, 6-9, 6-10, 6-12 and 9-6, which are products of the condensation of hexamethylene diamine with adipic acid, azelaic acid, sebacic acid, 1,12-dodecanedioic acid, and of nonamethylene diamine with adipic acid, respectively.

Polyurethanes and Polyurethane-Ureas Thermoplastic polyurethanes are linear or slightly chain-branched polymers consisting of hard blocks and soft elastomeric blocks. They are produced by reacting soft hydroxy-terminated elastomeric polyethers or polyesters with diisocyanates such as methylene diisocyanate (MDI) or toluene diisocyanate(TDI). These polymers can be chain extended with glycols, diamines, diacids, or aminoalcohols. The reaction products of the isocyanates and the alcohols are called urethanes and these blocks are relatively hard and high-melting. These hard, high-melting blocks are responsible for the thermoplastic nature of the polyurethanes.

Polyurethanes may also be thermoset, in which the comonomers are mixed and heated in a mold to form a copolymer formed to the desired shape.

Polyurethanes and polyurethane-ureas useful in articles of this invention are prepared by reaction of (a) a glycol such as polytrimethylene ether glycol, (b) diisocyanate, and (c) diol or diamine chain extender.

Polytrimethylene ether glycol is described above.

Any diisocyanate useful in preparing polyurethanes and polyurethane-ureas from polyether glycols, diisocyanates and diols or amines can be used in this invention. They include 2,4-toluene diisocyanate, 2,6-toluene diisocyanate ("TDI"), 4,4'-diphenylmethane diisocyanate or ("MDI"), 4,4'-dicyclohexylmethane diisocyanate ("H$_{12}$MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylyene diisocyanate, isophorone diisocyanate ("IPDI"), and combinations thereof. MDI, HDI, and TDI are preferred because of their ready commercial availability.

Polyurethanes are formed when diol chain extenders are used, as polytrimethylene ether glycols and alcohols bond to isocyanates to form urethane linkages. Polyurethane-ureas are formed when diamine chain extenders are used, as polytrimethylene ether glycols and isocyanates bond to form urethane linkages and amines bond to isocyanates to form urea linkages.

Any diol or diamine chain extender useful in preparing polyurethanes and polyurethane-ureas from polyether glycols, diisocyanates and diol or amine chain extenders can be used in this invention.

Diol chain extenders useful in making the polyurethanes used in the invention include ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis (hydroxyethoxy)benzene, bis(hydroxyethylene) terephthalate, hydroquinone bis(2-hydroxyethyl) ether, and combinations thereof. Preferred are ethylene glycol, 1,2-propylene glycol, 1,3-propanediol, 1,4-butanediol, 1,6-hexanediol, and 2-methyl-1,3-propanediol.

Diamine chain extenders useful in making the polyurethanes used in the invention include 1,2-ethylenediamine, 1,6-hexanediamine, 1,2-propanediamine, 4,4'-methylene-bis (3-chloroaniline) (also known as 3,3'-dichloro-4,4'-diaminodiphenylmethane, "MOCA" or "Mboca"), dimethylthiotoluenediamine ("DMTDA"), 4,4'-diaminodiphenylmethane ("DDM"), 1,3-diaminobenzene, 1,4-diaminobenzene, 3,3'-dimethoxy-4,4'-diamino biphenyl, 3,3'-dimethyl-4,4'-diamino biphenyl, 4,4'-diamino biphenyl, 3,3'-dichloro-4,4'-diamino biphenyl, and combinations thereof.

Processes to prepare such polyurethanes and polyurethane-ureas are described in U.S. Patent Application Publication No. 2004/0030060.

The micropulp can be dispersed in glycols, di-amines, amino-glycols, di-ols (for example, 1,4-butanediol or 1,3-propanediol). The micropulp dispersion can then be combined with the other comonomers used in preparation of the polyurethane and mixed. After mixing and polymerization, the micropulp is effectively incorporated into either thermoplastic or thermoset polyurethanes.

Ionomers

Ionomeric resins ("ionomers") are copolymers of an olefin such as ethylene and an unsaturated carboxylic acid, such as acrylic acid, methacrylic acid, or maleic acid, and optionally softening comonomers, in which at least one alkali metal, transition metal, or alkaline earth cation, such as lithium, sodium, potassium, magnesium, calcium, or zinc, or a combination of such cations, is used to neutralize some portion of the acidic groups in the copolymer, resulting in a thermoplastic resin exhibiting enhanced properties. For example, "ethylene/(meth)acrylic acid (abbreviated E/(M)AA)" means a copolymer of ethylene (abbreviated E)/acrylic acid (abbreviated AA) and/or methacrylic acid (abbreviated MM), which can then be at least partially neutralized by one or more alkali metal, transition metal, or alkaline earth cations to form an ionomer.

Ionomers useful in this invention include E/(M)AA dipolymers having from about 2 to about 30 weight % (M)AA, at least partially neutralized as described below.

The acid copolymers may optionally contain a third "softening" monomer that disrupts the crystallinity of the polymer. These acid copolymers, when the alpha olefin is ethylene, can be described as E/X/Y copolymers wherein E is derived from ethylene, X is derived from an α,β ethylenically unsaturated carboxylic acid, particularly acrylic and methacrylic acid, and Y is derived from a softening co-monomer. Preferred softening co-monomers are $C_1$ to $C_8$ alkyl acrylate or methacrylate esters. X and Y can be present in a wide range of percentages, X typically up to about 35 weight percent (wt. %) of the polymer and Y typically up to about 50 weight percent of the polymer.

The copolymer(s) of alpha olefin, $C_3$ to $C_8$ α,β ethylenically unsaturated carboxylic acid and softening monomer from which the melt processible ionomers described above are prepared can be made by methods known in the art. The copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, and ethylene/(meth)acrylic acid/ethyl (meth)acrylate terpolymers.

The ionomer compositions useful in this invention are at least partially neutralized by at least one of the alkali metal, alkaline earth or transition metal cations. Preferably at least 30 %, alternatively at least 45%, alternatively at least 50%, alternatively at least 60% of the available acid moieties in the composition are neutralized. Cations are selected from the group consisting of lithium*, sodium*, potassium, magnesium*, calcium, barium, lead, tin, or zinc* (* indicates a preferred cation), or a combination of such cations.

Neutralization can be effected by first making the E/(M)AA copolymer and treating the copolymer with inorganic base(s) with alkali metal, alkaline earth or transition metal cation(s). Methods for preparing ionomers from copolymers are well known in the art. The copolymers are melt-processible, at least partially neutralized copolymers of ethylene and $C_3$ to $C_8$ $\alpha,\beta$ ethylenically unsaturated carboxylic acids. The resulting ionomer(s) can be melt-blended with modifiers and/or other polymers. Processes for organic acid (salt) modifications of ionomers are known in the art. To achieve desired higher neutralization the resulting blend of ionomers can be further neutralized.

The ionomer(s) are blended with organic acids and organic fiber micropulp to prepare compositions useful in this invention. The organic acid and micropulp are typically prepared as a dispersion of the micropulp in the organic acid prior to blending with the ionomer. Such dispersions can be readily prepared by using the organic acid as the liquid component in the attrition process described above for the preparation of the organic micropulp. Pending U.S. patent application Ser. No. 10/428,294 provides more detailed descriptions of preparing such dispersions. Alternatively, the non-neutralized ethylene acid copolymers, organic acids and organic fiber micropulp are melt-blended and then neutralized in situ. In this case the desired level of neutralization can be achieved in one step.

As indicated above, the ethylene acid ionomers can be melt-blended with organic fiber micropulp and organic acids or salts thereof. The organic acids that may be optionally employed in the present invention are particularly those that are non-volatile and non-migratory. By non-volatile, it is meant that they do not volatilize at temperatures of melt blending the agent with the acid copolymer. By non-migratory, it is meant that the agent does not bloom to the surface of the polymer under normal storage conditions (ambient temperatures). Organic acids that may be employed in the present invention include aliphatic, mono-functional (saturated, unsaturated, or multi-unsaturated) organic acids, particularly those having from 6 to 36 carbon atoms. Fatty acids are preferred. Particular organic acids useful in the present invention include caproic acid, caprylic acid, capric acid, lauric acid, stearic acid, behenic acid, erucic acid, oleic acid, and linoleic acid, particularly aliphatic, mono-functional organic acid(s) having from 6 to 36 carbon atoms. Iso-Stearic, linoleic and oleic acids are preferred.

Particularly, the organic fiber micropulp-modified acid copolymer ionomers of this invention can be produced by (a) melt-blending (1) ethylene, $\alpha,\beta$ ethylenically unsaturated $C_3$ to $C_8$ carboxylic acid copolymer(s) or melt-processible ionomer(s) thereof (including copolymers with the optional addition of a softening monomer) with (2) sufficient organic fiber micropulp, and (3) non-volatile, non-migratory organic acids, and concurrently or subsequently (b) adding a sufficient amount of a source of cations in the presence of added water to achieve the desired level of neutralization of all the acid moieties, including those in the acid copolymer and the non-volatile, non-migratory organic acids.

The blends of ionomers, organic fiber micropulp and organic acids useful in this invention can be made by melt blending the organic fiber micropulp and organic acid with a melt processible ionomer made separately and then optionally further neutralizing with the same or different cations to achieve desired levels of neutralization of the resulting blend of ionomer, organic fiber micropulp and organic acid salt. Alternatively, the non-neutralized ethylene acid copolymers, organic fiber micropulp and organic acids are melt-blended and neutralized in situ. In this case the desired level of neutralization can be achieved in one step.

For example, ethylene copolymers containing (meth)acrylic acid can be melt blended with organic fiber micropulp and oleic acid (or other organic acids and neutralized in situ with a cation source to convert at least some of the acid moieties of the oleic acid and the acid copolymer, modified by incorporation of organic fiber micropulp, into oleate-modified ionomers modified with organic fiber micropulp of various degrees of neutralization, up to and including 100%.

Compositions with mixed ions could be prepared by treating an already partially neutralized ionomer (or blend thereof) with an alternate cation source. For example, an ionomer blend at least partially neutralized by sodium can be modified by melt-processing with an amount of magnesium hydroxide sufficient to neutralize at least some of the remaining acid functionalities into an ionomer with a mixture of sodium and magnesium ions.

A non-limiting example of melt blending is described here. Employing a Werner & Pfleiderer (W&P) twin-screw extruder, the stoichiometric amount of magnesium hydroxide in the form of concentrate needed to neutralize the target amount of acid in the acid copolymer and organic acid(s) (Nominal % Neutralization) is pre-blended with the acid copolymer as a pellet blend. The pellet blend is melt-mixed with the organic fiber micropulp and organic acid and neutralized in the W&P twin-screw extruder in the presence of added water.

The organic fiber micropulp and organic acids are added in an amount sufficient to enhance the toughness and durability properties of the copolymer over the nonmodified copolymer. The organic fiber micropulp is added in an amount from about 0.05 weight % to about 10 weight %, alternatively from about 0.1 weight % to about 5 weight %, alternatively from about 0.1 weight % to about 3 weight %, alternatively from about 0.1 weight % to about 1 weight %. The organic acids are added in an amount from about 5 weight % to about 66 weight %; such that the combined weight % of the organic fiber micropulp and the organic acids is from about 5 weight % to about 70 weight % of the total amount of the composition or blend. Alternatively, the organic fiber micropulp and organic acids are added in an amount from about 10 weight % to about 60 weight %, alternatively from about 15 to 50 weight %, 25 to 50 weight %, 30 to 45 weight %, 35 to 45 weight %. The amount of organic acids is from 10 to 120, alternatively 20 to 100, alternatively 30 to 100 times the amount of micropulp. For example a ratio of organic acid to micropulp from about 30 to about 100 can be obtained by incorporation of a dispersion of 1 to 3 weight % micropulp in organic acid into the composition.

Other Components

Optionally, the composition may contain up to 200 parts by weight thermoplastic non-ionomeric polymers and/or up to 170 parts by weight fillers based on 100 parts by weight of the of the micropulp-modified blend. Other additives such as stabilizers and processing aids can be included.

As indicated above, the micropulp-modified compositions described above may also be blended with additional nonionomeric thermoplastic polymers. The additional thermoplastic polymer components can be selected from among copolyetheresters, copolyetheramides, elastomeric polyolefins, styrene diene block copolymers, thermoplastic polyurethanes, etc., these classes of polymers being well known in the art.

The nonionic thermoplastic resins include, by way of non-limiting illustrative examples, thermoplastic elastomers, such as polyurethanes; polyureas; polyamides; polyesters; copolyetheresters; copolyetheramides; copolyetherurethanes; copolyetherureas; PEBAX (a family of block copolymers based on polyether-block-amide, commercially supplied by Atochem); styrene-butadiene-styrene (SBS) block copolymers; styrene(ethylene-butylene)-styrene block copolymers, etc.; polyamides (oligomeric and polymeric); polyesters; polyolefins including polyethylene, polypropylene, ethylene/propylene copolymers, elastomeric polyolefins, etc.; ethylene copolymers with various polar comonomers such as vinyl acetate, (meth)acrylates, carbon monoxide, epoxy-containing comonomers, etc.; polymers functionalized with maleic anhydride, epoxides, etc., either by copolymerization or by grafting; elastomers such as EPDM; metallocene catalyzed polyethylene and polypropylene and copolymers; ground up powders of the thermoset elastomers, etc.

The copolyetheramides are well known in the art as described in U.S. Pat. No. 4,331,786, for example. They are comprised of a linear and regular chain of rigid polyamide segments and flexible polyether segments.

The elastomeric polyolefins are polymers composed of ethylene and higher primary olefins such as propylene, hexene, octene and optionally 1,4-hexadiene and or ethylidene norbornene or norbornadiene. The elastomeric polyolefins can be functionalized with maleic anhydride.

Block styrene diene copolymers are composed of polystyrene units and polydiene units. The polydiene units are derived from polybutadiene, polyisoprene units or copolymers of these two. In the case of the copolymer it is possible to hydrogenate the polyolefin to give saturated rubbery backbone segments. These materials are usually referred to as SBS, SIS or SEBS thermoplastic elastomers and they can also be functionalized with maleic anhydride.

Fillers

An optional filler component of the subject invention is chosen to impart additional density to the organic micropulp-modified compositions with other materials. Preferred densities for golf balls include densities in the range starting with the density of unfilled polymer to 1.8 gm/cc. Generally, the filler will be inorganic, having a density greater than about 4 gm/cc, preferably greater than 5 gm/cc, and will be present in amounts from 0 to about 60 weight % based on the total weight of the composition. Examples of useful fillers include zinc oxide, barium sulfate, lead silicate and tungsten carbide, tin oxide, as well as the other well known corresponding salts and oxides thereof. It is preferred that the filler materials be non-reactive or almost non-reactive with the polymer components described above when the ionomers are less than completely neutralized. If the ionomers are fully neutralized, reactive fillers may be used. Zinc Oxide grades, such as Zinc Oxide, grade XX503R available from Zinc Corporation of America, that do not react with any free acid to cause cross-linking and a drop in MI are preferred, particularly when the ionomer is not fully neutralized.

Other optional additives include titanium dioxide, which is used as a whitening agent or filler; other pigments, optical brighteners; surfactants; processing aids; etc.

Uses of the Micropulp-modified Composition in Golf Balls

The micropulp-modified blends described herein are useful substitutions for one or more materials taught in the art at the levels taught in the art for use in covers, mantles, intermediate layers, cores, and centers of golf balls, or one-piece golf balls. See, for examples of materials for covers of golf balls, U.S. Pat. Nos. 4,274,637; 4,264,075; 4,323,247; 4,337,947, 4,398,000; 4,526,375; 4,567,219; 4,674,751; 4,884,814; 4,911,451; 4,984,804; 4,986,545; 5,000,459; 5,068,151; 5,098,105; 5,120,791; 5,155,157; 5,197,740; 5,222,739; 5,253,871; 5,298,571; 5,321,089; 5,328,959; 5,330,837; 5,338,038; 5,338,610; 5,359,000; 5,368,304; 5,567,772; 5,757,483; 5,810,678; 5,873,796; 5,902,855; 5,971,870; 5,971,871; 5,971,872; 5,973,046; 5,976,443; 6,018,003; 6,096,830; and PCT Patent Application Publication WO 99/48569.

Golf balls prepared in accordance with this invention comprise a cover or inner layers made from the micropulp-modified blends described herein replacing any traditional golf ball cover or inner layer material such as Surlyn® ionomer resin, balata rubber or thermoset/thermoplastic polyurethanes and the like. Said golf balls will have a traditional dimple pattern and may be coated with a polyurethane coating or be painted for appearance purposes, but such a coating and/or painting will not affect the performance characteristics of the ball. However, coating and/or painting may affect the scuff resistance of the ball. In particular, such coating and/or painting may improve scuff resistance over that of an unfinished ball. For the purposes of this invention, any coating and/or painting are not considered to be part of a golf ball cover.

Two-piece golf ball

As used herein, the term "two-piece ball" refers to a golf ball comprising a core and a cover. These two-piece balls are manufactured by first molding the core from a thermoset or thermoplastic composition, positioning these preformed cores in injection molding cavities using retractable pins, then injection molding the cover material around the cores. Alternatively, covers can be produced by compression molding cover material over the cores. The micropulp-modified blend described herein can be used as the core or preferably the cover of such golf balls to prepare a golf ball of this invention.

Three-piece golf ball

As used herein, the term "three-piece ball" refers to a golf ball comprising a center, a traditional elastomeric winding wound around the center, and a cover. Three-piece golf balls are manufactured by well-known techniques as described in, for example, U.S. Pat. No. 4,846,910. The micropulp-modified blend described herein can be used as the cover and/or the center of such golf balls to prepare a golf ball of this invention.

Multi-Layer golf ball

As used herein, the term "multi-layer ball" refers to a golf ball comprising a core, a cover, and one or more mantles or intermediate layers between the core and the cover. These multi-layer balls are manufactured by first molding or making the core, compression- or injection-molding the mantle(s) over the core, and then compression- or injection-molding a cover over the mantle. The micropulp-modified blend described herein can be used as the core, mantle, intermediate layers, or the cover of such golf balls to prepare a golf ball of this invention.

As indicated above, golf ball cores may be solid or wound. Solid cores may be molded in one piece using compression or injection molding techniques. A wound core is generally produced by winding a very large elastic thread around either a solid center or a liquid-filled balloon center. As indicated, additional mantle layers may be applied over the core to produce a multi-layer ball. For the purposes of this invention, the term solid core indicates a molded core without the rubber band winding.

One-piece golf ball

As used herein, the term "one-piece ball" refers to a golf ball molded from a thermoplastic composition, i.e., not having elastomeric windings, cores or mantles and in which the whole ball is a homogeneous solid spheroid. The one-piece molded ball will have a traditional dimple pattern and may be coated with a polyurethane coating or painted for appearance purposes, but such a coating and/or painting will not affect the performance characteristics of the ball. These one-piece balls are manufactured by direct injection molding techniques or by compression molding techniques. The micropulp-modified blend described herein is used in such balls in combination with other materials typically used in these balls to prepare a golf ball of this invention.

Covers, mantles, intermediate layers, cores, centers for golf balls comprising the micropulp-modified blend described herein, or blends thereof with nonionomeric thermoplastic resins, are included in this invention. The covers, mantles, or intermediate layers can be made by injection or compression molding the micropulp-modified blend described above (with or without fillers, other components, and other thermoplastics) over a thermoplastic or thermoset core of a two-piece, three-piece, or multi-layered golf ball, over a core or windings around a thermoplastic or thermoset center.

The specific combinations of resilience and compression used in the practice of the subject invention will in large part be dependent upon the type of golf ball desired (e.g., one-piece, two-piece, three-piece, or multi-layered), and in the type of performance desired for the resulting golf ball as detailed below. In addition, a golf ball must meet the mass limit (45 grams) set by the United States Golfing Association (U. S. G. A.). Preferably, the ball has an overall density of about 1.14 gm/cc. In two-piece, three-piece or multi-layer balls, fillers as described above may be added to the cores, mantles and/or covers as required to provide golf balls meeting the mass limit. Depending on the composition(s) of the other pieces of the ball, covers or intermediate layers of this invention can be prepared from the micropulp-modified compositions described herein modified with filler(s) as described above to meet the mass limit.

Of note are one-piece balls in which the micropulp-modified blend is modified with fillers as described above to provide a golf ball meeting the mass limit (45 grams) set by the U. S. G. A. Preferably, enough filler is used so that the ball has an overall density of 1.14 gm/cc.

The golf balls of the present invention can be produced by molding processes that include but are not limited to those which are currently well known in the golf ball art. For example, the golf balls can be produced by injection molding or compression molding the novel cover or mantle compositions described herein around a wound or solid molded core to produce a golf ball having a diameter of about 1.680 to 1.800 inches and typically but not necessarily having a mass of about 45 g.

As indicated, the golf balls of this invention can be produced by forming covers or mantles comprising the micropulp-modified blend around cores by molding processes. For example, in compression molding, the cover composition is formed via injection at e.g. about 380° F. to about 450° F. into smooth hemispherical shells that are positioned around the core in a dimpled golf ball mold and subjected to compression molding at e.g. 200 to 300° F. for two to ten minutes, followed by cooling at 50 to 70° F. for two to ten minutes, to fuse the shells together to form a unitary ball. In one type of injection molding, the cover or mantle composition is injected directly around the core placed in the center of a golf ball-shaped mold for a period of time at a mold temperature from about 50° F. to 100° F.

One-piece balls, cores and centers may be prepared by similar injection molding methods.

After molding, the golf balls produced may undergo various further processing steps such as buffing, painting and marking.

In addition to their use in golf balls, the micropulp-modified compositions described herein are also useful for preparing heel counters, toe puffs and inner soles for footwear. Footwear structural components such as heel counters, toe puffs, and inner soles provide shape support for footwear construction.

The term "heel counter" as used herein refers to a stiff, curved piece that provides shape and structure to the heel area of a shoe.

The term "toe puff" (or "toe box") as used herein refers to a stiff, arched piece that provides shape and structure to the toe area of a shoe.

The heel counters and toe puffs can be prepared by injection- or compression-molding the compositions into the appropriate shapes.

Accordingly this invention provides a footwear structural component selected from the group consisting of heel counters, toe puffs, and inner soles comprising a composition comprising:

(a) at least one polymer selected from the group consisting of thermoplastic elastomers, thermoplastic carboxylic acid-based ionomers, polyurethane-ureas, thermoplastic polyurethanes and thermoset polyurethanes; and (b) micropulp produced from organic fibers.

Without further elaboration, it is believed that one skilled in the art using the preceding description can utilize the present invention to its fullest extent. The following Examples are, therefore, to be construed as merely illustrative, and not limiting of the disclosure in any way whatsoever.

General Procedures for Examples

Materials Used

Non-neutralized ethylene/(meth)acrylic acid copolymers are commercially available from DuPont under the trade name Nucrel®. Ionomer base resins are commercially available from DuPont under the trade name "Surlyn®. The ionomers used in the Examples are derived from ethylene/(meth) acrylic acid copolymers with from about 9 weight % to 19 weight % methacrylic acid, optionally comprising an alkylacrylate comonomer, that have melt indices (MI) of about 60. The ethylene/(meth)acrylic acid copolymers are neutralized under standard conditions to provide the ionomer base resins. Examples of base resins include the following (wherein E represents ethylene, MAA represents methacrylic acid, AA represents acrylic acid, nBa represent n-Butyl acrylate, the number % represents the weight % of comonomer present in the copolymer, with the nominal neutralization level indicated in % of the available carboxylic acid moieties neutralized and the atomic symbol representing the neutralizing cation).

| | |
|---|---|
| A: E/23.5% nBA/9% MAA, 51% neut. with Mg | B: E/19% MAA, 40% neut. with Mg, with MI of 1.1 |
| C: E/15% MAA, 47% neut. with Li, with MI of 2.6. | D: E/15% MAA, 52% neut. with Li, with MI of 1.8 |
| E: E/15% MAA, 59% neut. with Na, with MI of 0.93 | F: E/19% MAA, 37% neut. with Na, with MI of 2.6 |
| G: E/19% MAA, 36% neut. with Zn, with MI of 1.3 | H: E/19% MAA, 45% neut. with Li, with MI of 1.1 |

A liquid fatty acid, for example, oleic acid, is used as the attriting medium and carrier for the organic fiber micropulp to form a dispersion of organic fiber micropulp in fatty acid. The dispersion containing micropulp of the examples below was produced in a 15-liter Premier mill. Poly(p-phenylene terephthalamide) pulp (KEVLAR® pulp Merge 1F543) was mixed with oleic acid in quantities sufficient to form a 1 percent by weight dispersion of pulp in oleic acid. 188 pounds (85 kilograms) of the 1% dispersion was charged in the mix tank of the mill. This dispersion was fed to the 15-liter Premier mill at a rate of 2 lbs/min (0.9 kg/min) for a single pass through the mill and collected in another tank. These single passes were repeated until a total of 9 passes were completed.

Stable dispersions with 1 to 3% micropulp loading were produced in oleic acid.

This dispersion was injected into an extruder containing molten ionomers of either a copolymer of ethylene and methacrylic acid (19% by weight) or a copolymer of ethylene, n-butylacrylate (23.5% by weight) and methacrylic acid (9% by weight) that was partially neutralized with magnesium hydroxide. In an in situ blending and neutralization process, the oleic acid/organic fiber micropulp dispersion was blended with the ionomer and, simultaneously, the $Mg(OH)_2$ reacted with the carboxylic acids in the ionomer and the oleic acid to form Mg salts. The neutralization by-product water was vacuum extracted from the extruder and a composition comprising an ethylene acid copolymer having organic fiber micropulp and the oleate dispersed therein was extruded in the form of pellets.

Comparative Examples are the base ionomers or blends without the organic micropulp modifier, prepared and extruded in similar fashion.

The compositions, initially prepared as pellets, were melted, extruded and molded into the appropriate shapes for mechanical property testing. The materials were injection molded into flex bars and tensile testpieces and then tested for Shore D hardness, room temperature flex modulus, Vicat softening point, and room temperature tensile properties, which were measured as described below and are reported in Table 1. The compositions were also molded over a commercial thermoset rubber core, and then tested for golf ball properties, such as Atti compression, coefficient of restitution (COR) and scuff resistance.

Testing Criteria for Examples

Melt Index (MI) was measured in accord with ASTM D-1238, condition E, at 190° C., using a 2160-gram weight, with values of MI reported in grams/10 minutes.

Shore D hardness was determined in accord with ASTM D-2240. Shore D hardness was also measured on the two-piece golf ball spheres.

Coefficient of Restitution (COR) is measured by firing an injection-molded neat sphere of the resin having the size of a golf ball from an air cannon at a velocity determined by the air pressure. The sphere strikes a steel plate positioned three feet away from the point where initial velocity is determined, and rebounds through a speed-monitoring device located at the same point as the initial velocity measurement. The return velocity divided by the initial velocity is the COR. The initial velocity generally employed is either 125 feet/second (COR-125) or 180 feet/second (COR-180).

Atti Compression (Atti Comp.), also known as PGA Compression, is defined as the resistance to deformation of a golf ball, measured using an Atti Compression Gauge. The Atti Compression Gauge is designed to measure the resistance to deformation or resistance to compression of golf balls that are 1.680 inches in diameter. In these examples, smaller spheres approximately 1.53 inches in diameter were used. Spacers or shims were used to compensate for this difference in diameter. The sphere diameters were measured. A shim thickness was calculated such that the sphere diameter plus shim thickness equaled 1.680 inches. Then the PGA compression of the sphere and shim was measured. A set of shims of different thicknesses was used to correct the sphere diameter plus shim thickness to within 0.0025 inches of 1.680 inches. After the PGA compression measurement was made, the value was mathematically corrected to compensate for any deviation from 1.680 inches. If the sphere diameter plus shim thickness was less than 1.680 inches, one compression unit was added for every 0.001 inch less than 1.680 inches. If the sphere diameter plus shim thickness was greater than 1.680 inches, one compression unit was subtracted for every 0.001 inch greater than 1.680 inches.

Scuff resistance was determined in the following manner: a D-2 tool steel plate machined to simulate a sharp grooved pitching wedge with square (box) grooves was obtained and was mounted on a swing arm that swings in a horizontal plane. The simulated club face was oriented for a hit on a golf ball at a 54° angle. The machine was operated at a club head speed of 140 feet per second. Balls were prepared as described above from each of the test compositions. Comparison balls with polyurethane covers were obtained commercially. At least three balls of each composition were tested and each ball was hit once. After testing, the balls were rated according to the following criteria (see Table A). Scuff damage was characterized by the presence of indented lines, lifts or groove bands. Indented lines are visible lines created by permanent displacement of the resin, but without cutting, breaking or discontinuity of the surface. Lifts are scuffs in which the resin is displaced enough that the surface is broken such that a portion of the resin is separated from the bulk of the ball. Severe lifts include flaps, whiskers or strands. Groove bands are bands of resin missing from the bulk of the ball corresponding in dimension to a single groove of the club face. The ratings were assigned numerical values based on the criteria in Table A.

TABLE A

| | |
|---|---|
| 0 | No sign of impact |
| 1 | One or more indented lines on a ball, but no separation of resin from the bulk of the ball. |
| 2 | One or more lifts on a ball. Resin separated from the ball on one edge but still firmly attached. |
| 3 | Severe lifts and whiskers. Flaps and strands of resin separated from the bulk of the ball but generally still attached. |
| 4 | One or more groove bands, but undamaged resin between groove bands. |
| 5 | Material missing entirely between two or more grooves bands. |

Decimal fraction ratings can be assigned between these descriptions. For example, barely visible indented lines may be rated 1.0 while deeply indented lines that push up ridges of the resin may be rated 1.8. One lift may be rated 2.0 while three or four lifts may be rated 2.5. A ball rated 3 may look more damaged than a ball rated 4 or 5 because missing material may be less noticeable than flaps and/or whiskers.

EXAMPLES AND COMPARATIVE EXAMPLES

Example 1

BASE RESIN A was melt blended with a 1% poly(p-phenylene terephthalamide) fiber micropulp dispersion in oleic acid (prepared as described above) at 85:15 blend ratio in the presence of the stoicheometric amount of $Mg(OH)_2$ for nominally neutralizing 100% of the free acids in the system in a twin-screw extruder.

Example 2

BASE RESIN A was melt blended with a 1% poly(p-phenylene terephthalamide) fiber micropulp dispersion in oleic acid (prepared as described above) at 65:35 blend ratio in the presence of the stoicheometric amount of Mg(OH)2 for nominally neutralizing 110% of the free acids in the system in a twin-screw extruder.

Example 3

BASE RESIN B was melt blended with a 1% poly(p-phenylene terephthalamide) fiber micropulp dispersion in oleic acid (prepared as described above) 85:15 blend ratio in the presence of the stoicheometric amount of Mg(OH)2 for nominally neutralizing 100% of the free acids in the system in a twin-screw extruder.

Micropulp-modified compositions of this invention prepared as Examples 1 through 3 and comparative examples of the unmodified compositions (Comparative Examples C1 and C2) are reported in Table 1 (percentages of the components listed in Table 1 are weight %). Also provided are properties of test pieces comprising the compositions determined as described above.

TABLE 1

| | Ex. 1 | Ex. 2 | Ex. 3 | Comparative Ex. C1 | Comparative Ex. C2 |
|---|---|---|---|---|---|
| Base Resin | A | A | B | A | B |
| Oleate (wt. %) | 15 | 35 | 15 | 0 | 0 |
| Micropulp (wt. %) | 0.15 | 0.35 | 0.15 | 0 | 0 |
| Melt Index at 190° C. | 3.8 | 0.5 | 0.6 | 0.95 | 1.1 |
| Injection molded flex bars | | | | | |
| Shore D | 39.3 | 42.5 | 60.3 | 46 | 63.3 |
| Flex modulus (kpsi) | 1.9 | 5.2 | 36.2 | 4.8 | 60.9 |
| Vicate Softening point (° C.) | 44.7 | 52.7 | 54.9 | 58.9 | 48.1 |
| Room temperature tensile properties | | | | | |
| Young's Modulus (kpsi) | 2.35 | 6.15 | 36.8 | 6.32 | 74.4 |
| Yield point (kpsi) | 0.94 | 1.46 | 3.3 | 2.03 | 3.21 |
| Yield strain (%) | 172 | 132 | 63 | 143 | 30 |

TABLE 1-continued

| | Ex. 1 | Ex. 2 | Ex. 3 | Comparative Ex. C1 | Comparative Ex. C2 |
|---|---|---|---|---|---|
| Tensile Strength (kps)i | 0.98 | 1.46 | 3.3 | 2.03 | 3.21 |
| Elongation at break (%) | 207 | 135 | 63 | 149 | 76 |
| 2-piece golf ball properties | | | | | |
| Hardness | 36 | 43 | 62 | na | na |
| COR-125 | 0.757 | 0.777 | 0.779 | na | na |
| COR-180 | 0.691 | 0.71 | 0.717 | na | na |
| Scuff resistance* | 1.3 | 2 | 2.7 | 1.5 | 5 |

*Scuff rating: 0 to 5, with 5 being the worst

The micropulp-modified ionomers useful in this invention demonstrated improved toughness and scuff resistance over that of unmodified ionomer comparative examples.

What is claimed is:

1. The footwear structural component selected from the group consising of heel counters, toe puffs, and inner soles; wherein said footwear structural component comprises a composition, and said composition comprises
   (i) at least one E/X/Y copolymer where E represents copolymerized residues derived from ethylene, X represents copolymerized residues derived from a $C_3$ to $C_8$ α,β ethylenically unsaturated carboxylic acid, and Y represents copolymerized residues derived from a softening comonomer selected from alkyl acrylate and alkyl methacrylate wherein the alkyl groups have from one to eight carbon atoms, wherein tha amount of X is from about 2 to about 30 weight % of the E/X/Y copolymer and the amount of Y is from 0 to about 40 weight % of the E/X/Y copolymer;
   (ii) from about 0.05 weight % to about 10 weight % of micropulp produced from organic fibers; said micropulp having a volume average length ranging from 0.01 micrometers to 100 micrometers and a average surface area ranging from 25 to 500 $m^2/g$; wherein the micropulp is produced from organic fibers by a process comprising the steps of contacting the organic fibers with a medium comprising a liquid component and a solid component and agitating the organic fibers and the medium; and wherein the agitation results in a substantial reduction of the diameter of the organic fibers; and
   (iii) from about 5 weight % to about 66 weight % of one or more organic acids or salts thereof; such that the combined weight % of component (ii) and component (iii) is from about 5 weight % to about 70 weight %; where the combined carboxylic acid functionalities in all ingredients in the blend are at least partially neutralized by one or more inorganic bases having alkali metal, transition metal, or alkaline earth cations.

2. The footwear structural component of claim 1 wherein said organic fibers are made from aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or mixtures thereof.

3. The footwear structural component of claim 2 wherein said aromatic polyamide is poly(p-phenylene terephthalamide).

4. The footwear structural component of claim 1 wherein said composition further comprises at least one additional polymer selected from nonionomeric thermoplastic polymers.

5. A footwear structural component selected from the group consising of heel counters, toe puffs, and inner soles; wherein said footewar structural component comprises a composition, and said composition comprises
   (a) at least one thermoplastic elastomer selected from copolyetheresters or copolyetheramides; and
   (b) micropulp having a volume average length ranging from 0.01 micrometers to 100 micrometers and a average surface area ranging from 25 to 500 $m^2/g$; wherein the micropulp is produced from organic fibers by a process comprising the steps of contacting the organic fibers with a medium comprising a liquid component and and wherein the agitation results in a substantial reduction of the diameter of the organic fibers.

6. The footwear structural component of claim 5 wherein the at least one thermoplastic elastomer is selected from copolyetheresters.

7. The footwear structural component of claim 6 wherein in said copolyetheresters the polyether segment is obtained by polymerization of tetrahydrofuran and the polyester segment is obtained by polymerization of tetramethylene glycol and phthalic acid.

* * * * *